United States Patent [19]

Bittner et al.

[11] Patent Number: 4,640,832

[45] Date of Patent: Feb. 3, 1987

[54] PROCESS FOR THE PRODUCTION OF SODIUM POLYSULFIDES FROM THE ELEMENTS SODIUM AND SULFUR

[75] Inventors: Friedrich Bittner, Bad Soden; Walter Hinrichs, Brühl; Herbert Hovestadt, Erftstadt; Ludwig Lange, Brühl; Erich Splett, Hürth-Berrenrath, all of Fed. Rep. of Germany

[73] Assignee: Degussa Aktiengesellschaft, Frankfurt am Main, Fed. Rep. of Germany

[21] Appl. No.: 772,395

[22] Filed: Sep. 4, 1985

[30] Foreign Application Priority Data

Oct. 6, 1984 [DE] Fed. Rep. of Germany ....... 3436698

[51] Int. Cl.$^4$ .................. C01B 17/22; C01B 17/34
[52] U.S. Cl. ........................... 423/562; 423/565
[58] Field of Search ............... 423/560, 561 R, 562, 423/511, 641, DIG. 6, 565

[56] References Cited

U.S. PATENT DOCUMENTS

| | | | |
|---|---|---|---|
| 2,202,252 | 5/1940 | Herzog | 423/641 |
| 2,660,517 | 11/1953 | Padgitt | 423/641 |
| 2,809,096 | 10/1957 | Hulse | 423/641 |

FOREIGN PATENT DOCUMENTS

| | | | |
|---|---|---|---|
| 385895 | 7/1932 | United Kingdom | 423/562 |
| 858058 | 1/1961 | United Kingdom | 423/DIG. 6 |

OTHER PUBLICATIONS

Supplement to Mellors Comprehensive Theatise on Inorganic & Theoretical Chemistry, vol. II, Supplement II, The Alkali Metals Part 1, John Wiley & Sons, Inc., NY, NY, 1961, pp. 991-992.

*Primary Examiner*—Gary P. Straub
*Attorney, Agent, or Firm*—Cushman, Darby & Cushman

[57] ABSTRACT

There is described a process for the production of pure sodium polysulfides directly from the elements sodium and sulfur. For this purpose, the sodium and the sulfur under a protective gas and in a stoichiometrical ratio corresponding to the desired polysulfide are alternatingly dosed into a previously present melt of a polysulfide with vigorous stirring, the dosing being in portions such that upon introduction of the sodium the reaction mixture remains in the condition of a stirrable suspension and upon introduction of the sulfur this is completely reacted to a polysulfide of the desired or higher sulfur content.

18 Claims, No Drawings

PROCESS FOR THE PRODUCTION OF SODIUM POLYSULFIDES FROM THE ELEMENTS SODIUM AND SULFUR

BACKGROUND OF THE INVENTION

The invention is directed to a process for the production of pure sodium polysulfides directly from the elements sodium and sulfur.

It is known from Gmelin, Handbuch der anorganischen Chemie, 8th edition, Natrium (sodium), pages 466 et seq. as well as the supplementary volumes, issue 1, pages 184 et seq. and issue 3, pages 1049 et seq. that sodium sulfide and sodium polysulfide can be produced according to a large number of processes, e.g., by reaction of sodium salts with sulfur compounds, such as a sulfide or hydrogen sulfide, in aqueous or alcoholic solutions or in the fused condition with elemental sulfur in the presence of carbon or carbides as well as by reduction of sodium sulfate with hydrogen or other gases and sulfurizing the primarily formed sulfide to the desired polysulfide.

It is common to all known processes that there are obtained products more or less greatly contaminated with the reactants, which products must be separated from the impurities, e.g., through dissolving in suitable solvents and filtering. Polysulfides produced in solution likewise are more or less strongly contaminated by foreign salts. To produce solid anhydrous polysulfides, these products must then be subjected to expensive drying procedures, which is also true for the polysulfides obtained in the so-called amalgam process which polysulfides are pure but likewise only in solution.

It is known that the elements sodium and sulfur react extremely vigorously with each other (enthalpy of formation for $Na_2S$: $\Delta H_B = -389.1$ kJ/Mole, for the crystalline $Na_2S_4$: $\Delta H_{298.16°} = -412$ kJ/mole), so that as yet it has not been possible to industrially employ directly the elements which are obtainable on the market in great purity to produce the polysulfides.

Rather, there have been attempts to dampen the reaction of sodium with sulfur, e.g., by dissolving the sodium in liquid ammonia or by diluting it through mixing with sodium chloride or by covering it under boiling toluene.

SUMMARY OF THE INVENTION

There has now been found a process for the production of sodium polysulfides, preferably sodium tetrasulfide $Na_2S_4$ and polysulfides of the stoichiometrical composition $Na_2S_3$ from the elements sodium and sulfur in highly pure, absolutely water and solvent free form which comprises alternatingly dosing sodium and sulfur under protective gas in a stoichiometrical ratio corresponding to the desired sulfide into a preformed melt of a polysulfide with vigorous stirring in portions such that upon introduction of the sodium even in formation of such lower polysulfide intermediate products which are present in the liquid melt in heterogeneous phase, the reaction mixture remains in the condition of a stirrable suspension and upon the introduction of sulfur this is then completely reacted to form a polysulfide of the desired or higher sulfur content.

Which polysulfide is formed in this process thus depends on the particular stoichiometric ratios set up in the intermittent charging of the reactants. The extremely vigorous reaction of the pure elements with each other is rendered safe according to the invention by, e.g., in a preparation of sodium tetrasulfide, not bringing the sodium directly into contact with the elemental sulfur, but introducing it in small amounts and in thin streams into a hot tetrasulfide melt (M.P. $Na_2S_4 = 285°$ C.) at about 300° C. whereby there are formed intermediate lower polysulfides, e.g., of the stoichiometric composition or sum formula $Na_2S_3$ or $Na_2S_2$ and other polysulfides, each with higher melting points, which are converted back again into the desired polysulfide, thus $Na_2S_4$, by subsequently charging the necessary amounts of sulfur. A corresponding process is used in preparing polysulfides in the stoichiometric composition $Na_2S_3$ or $Na_2S_2$.

It has proven very suitable for the batchwise operation in withdrawing the finished product to always leave the reactor about one-third to one-half full, in order that the exothermic reaction with the addition of sodium is damped by a relatively large amount of polysulfide melt as a heat buffer and the heat can be efficiently led away via the reactor wall.

In the process of the invention the sodium and the sulfur can be dosed into the reactor in form of a liquid melt or in solid, finely divided or in other large surface area form. Solid sodium can be dosed in also as a pressed wire.

According to a favorable and preferred form of the process, the temperature of the preformed melt is held above the melting point of the polysulfide in question ,i.e., in the range of 200°-600° C. via the speed of introduction of the sodium and/or by heat withdrawal.

The temperature of the melt in the production of $Na_2S_3$ or $Na_2S_4$ is preferably 340°-360° C.

In view of the corrosive polysulfide melt and the high reaction temperatures, there must be chosen a suitable material for the reaction apparatus. It has been established that the reaction is best carried out in a reactor whose parts coming in contact with the polysulfide melt consist of aluminum/magnesium alloys, especially AlMg 3, (DIN 1700 = International Registration Record No. 5754); glass carbon, or other material resistant to polysulfide melts or are jacketed with these materials or lined therewith.

As protective gas, there can be employed inert gases, preferably argon.

In the process of the invention, any vaporizing sulfur can be liquified by condensation and led back into the reactor which guarantees an economical operation.

A further subject of the invention is the use of aluminum/magnesium alloys, especially AlMg3 or glass carbon as apparatus material for handling polysulfide melts.

The invention is explained below in connection with the description of a concrete version of the process and apparatus which likewise is suited for the preparation of $Na_2S_4$ and a polysulfide of the stoichiometric composition $Na_2S_3$ as well as by illustrative examples of the preparation of both compounds carried out therewith.

A laboratory reactor made of stainless steel with a strong, plain base plate was lined with the alloy AlMg3 which is resistant to the reaction medium. The flange mounted cover made of AlMg3 was provided with a screwed in short feed pipe for alternately supplying sodium and flowers of sulfur, an inlet tube for the protective gas argon ending under the cover, a temperature probe and two stuffing boxes, one for carrying the AlMg3— jacketed shaft of a blade stirrer and the other for a height adjustable emptying pipe closable at its end by a Teflon (polytetrafluoroethylene) stopper. All reactor parts coming in contact with the melt, therefore, consist of the mentioned resistant alloy. With a clear width of 15 cm and a height of 30 cm, the reactor receive a maximum of 4 liters corresponding to about 7.5 kg of melt.

Before beginning the batchwise production, the reactor heat insulated at the jacket and standing on a continuously heatable electric plate was filled with about 3 kg of a hot melt at about 300° C. as the remainder of the previous batch. The closed reactor thereby stood under an argon pressure of about 50 Pa. Before opening the filling pipe, the argon flow was slightly increased to prevent the penetration of air and the liquid sodium heated to about 110° C. was injected in small portions of about 3 grams with a glass pipette. After carrying out the addition of about 30 grams of sodium, there was added via a funnel that had been erected the weighed out equivalent amount of sulfur for forming the desired polysulfide and again 30 grams of sodium were charged, etc. With increasing reactor contents, the alternating addition of amounts of sodium and sulfur could be doubled, toward the end even tripled.

During the filling, the stirring speed was 200 revolutions/min, it could be reduced to 100 revolutions/min in the following about 2 hours for solution of the intermediately forming grit of lower polysulfides. The closed reactor during this time was again placed under an argon pressure of about 50 Pa.

By throttling or turning off the heating during the feeding of sodium and sulfur, it was made certain that the reactor temperature never exceeded 350° C. in spite of the exothermic reaction. After the 2 hours "post reaction" by introduction of an AlMg3 pipette into the homogeneous melt, sample material was withdrawn for analysis: it turned out that only in rare cases there was needed an after charging of sodium or sulfur.

To withdraw the reaction product, the withdrawal tube of the reactor was lowered through the stuffing box up to a height of about 8 cm above the bottom, its side piece falling free over the reactor cover heated by an electrical strip heater to about 300° C. and, after opening the tube, the reactor partially emptied by increasing the internal pressure via the argon line up to a residual amount of about 3 kg. The outflowing melt was caught in a covered, flat cold pan having a bottom surface of 50×60 cm. under an argon atmosphere and allowed to solidify.

The process can comprise, consist essentially of, or consist of the recited steps with the stated materials.

DETAILED DESCRIPTION

Example 1

Production of Sodium Tetrasulfide $Na_2S_4$

| | |
|---|---|
| Present in Reactor (Remainder from Previous Batch) | = 2.970 kg $Na_2S_4$ |
| Sodium - Addition | = 1.176 kg Na |
| Sulfur - Addition | = 3.281 kg S |
| Production | = 4.457 kg $Na_2S_4$ |
| Product Removed | = 4.565 kg $Na_2S_4$* |
| Remainder (Present for Next Batch) | = 2.862 kg $Na_2S_4$ |

*Analysis:
26.25% Na (theoretical 26.39% Na)
73.67% S total (theoretical 73.61% S total)

Example 2

Production of Sodium Polysulfide of the Stoichiometric Composition $Na_2S_3$

| | |
|---|---|
| Present in Reactor (Remainder from Previous Batch) | = 3.105 kg $Na_2S_3$ |
| Sodium - Addition | = 1.399 kg Na |
| Sulfur - Addition | = 2.926 kg S |
| Production | = 4.325 kg $Na_2S_3$ |
| Product Removed | = 4.483 kg $Na_2S_3$* |
| Remainder (Present for Next Batch) | = 2.947 kg $Na_2S_3$ |

*Analysis:
32.20% Na (theoretical 32.34% Na)
67.67% S total (theoretical 67.66% S total)

The entire disclosure of German priority application No. P3436698.9 is hereby incorporated by reference.

What is claimed is:

1. A process for the production of pure sodium polysulfide from sodium polysulfides and the elements sodium and sulfur consisting essentially of step: (a) forming an initial melt consisting of sodium polysulfide having an initial sodium to sulfur ratio under a protective gas atmosphere, step (b) adding only one reactant from the group consisting of sodium and sulfur, to form an intermediate melt having a sodium to sulfur ratio different that of the initial melt, step (c) then adding the other of said reactants to the intermediate melt formed in step (b) to change its sodium to sulfur ratio to that of the product polysulfide, the amount of sodium and sulfur added being that to produce the product polysulfide and to convert the initial melt sodium to sulfur ratio to that of the product polysulfide.

2. A process according to claim 1 wherein the product polysulfide is $Na_2S_4$.

3. A process according to claim 1 wherein the product polysulfide is formed $Na_2S_3$.

4. A process according to claim 1 wherein the sodium and sulfur are supplied in molten or solid form.

5. A process according to claim 1 wherein the temperature of the polysulfide melt is maintained in the range of 200°–600° C. by controlling either the speed of introducing sodium or by removing heat.

6. A process according to claim 5 wherein $Na_2S_3$ or $Na_2S_4$ is produced at a temperature of the melt of 340°–360° C.

7. A process according to claim 1 wherein $Na_2S_3$ or $Na_2S_4$ is produced at a temperature of the melt of 340°–360° C.

8. A process according to claim 6 which is carried out in a reactor and wherein the parts of the reactor in contact with the polysulfide melt are made of aluminum-magnesium alloy or glass carbon.

9. A process according to claim 1 which is carried out in a reactor and wherein the parts of the reactor in contact with the polysulfide melt are made of, jacketed or lined with aluminum-magnesium alloy or glass carbon.

10. A process according to claim 9 wherein the parts of the reactor in contact with the polysulfide melt are made of jacketed or lined with, AlMg3.

11. A process according to claim 1 wherein the protective gas is an inert gas.

12. A process according to claim 11 wherein the inert gas is argon.

13. A process according to claim 1 wherein vaporized sulfur is condensed to the liquid form and returned to the reactor.

14. A process according to claim 1 consisting of the recited steps.

15. A process according to claim 13 consisting of the recited steps.

16. A process according to claim 1 wherein the final sodium to sulfur ratio is the same as the initial sodium to sulfur ratio.

17. A process according to claim 1 wherein the final sodium to sulfur ratio is different from the initial sodium to sulfide ratio.

18. A process according to claim 1 wherein steps (b) and (c) are repeated.

* * * * *